(12) United States Patent
Ishibashi (10) Patent No.: US 8,588,141 B2
(45) Date of Patent: Nov. 19, 2013

(54) NETWORK CONTROLLERS, COMMUNICATION SYSTEMS, AND BEARER TYPE DETERMINATION METHOD

(75) Inventor: Atsuko Ishibashi, Tokyo (JP)

(73) Assignee: NEC Corporation, Tokyo (JP)

( * ) Notice: Subject to any disclaimer, the term of this patent is extended or adjusted under 35 U.S.C. 154(b) by 288 days.

(21) Appl. No.: 13/122,268

(22) PCT Filed: Oct. 7, 2009

(86) PCT No.: PCT/JP2009/067472
§ 371 (c)(1),
(2), (4) Date: Apr. 1, 2011

(87) PCT Pub. No.: WO2010/041676
PCT Pub. Date: Apr. 15, 2010

(65) Prior Publication Data
US 2011/0176452 A1 Jul. 21, 2011

(30) Foreign Application Priority Data

Oct. 7, 2008 (JP) ................................. 2008-260546

(51) Int. Cl.
*H04W 4/00* (2009.01)
(52) U.S. Cl.
USPC ............ 370/328; 370/390; 370/432; 455/560
(58) Field of Classification Search
None
See application file for complete search history.

(56) References Cited

U.S. PATENT DOCUMENTS

| 2005/0147040 A1* | 7/2005 | Vayanos et al. ................ 370/235 |
| 2005/0169205 A1* | 8/2005 | Grilli et al. .................... 370/313 |
| 2010/0165902 A1* | 7/2010 | Kvernvik et al. ............. 370/312 |

FOREIGN PATENT DOCUMENTS

| CN | 1638493 A | 7/2005 |
| CN | 1684469 A | 10/2005 |
| CN | 1879327 A | 12/2006 |
| EP | 1 833 217 A1 | 9/2007 |
| JP | 2004260816 A | 9/2004 |
| JP | 2007502571 A | 2/2007 |
| JP | 2007518340 A | 7/2007 |
| JP | 2007533217 A | 11/2007 |
| JP | 2008509613 A | 3/2008 |
| JP | 2008527904 A | 7/2008 |

OTHER PUBLICATIONS

International Search Report for PCT/JP2009/067472 mailed Nov. 2, 2009.
Chinese Office Action for CN 200980139952.9 issued on Apr. 1, 2013 with English Translation.

* cited by examiner

*Primary Examiner* — Bob Phunkulh (57) ABSTRACT

Terminal management means stores information with respect to a terminal that joins a delivery service provided in each cell in a context that serves to manage the information with respect to the terminal. Terminal counting means counts the number of terminals that joins the delivery service in the each cell on the basis of each service using the context stored in the terminal management means. Bearer determination means determines whether to use a point-to-point bearer or a point-to-multipoint bearer for the delivery service in the each cell based on the number of terminals counted by the terminal counting means.

8 Claims, 3 Drawing Sheets

NETWORK CONTROLLERS, COMMUNICATION SYSTEMS, AND BEARER TYPE DETERMINATION METHOD

TECHNICAL FIELD

The present invention relates to communication systems that can select the type of bearer used for a delivery service.

BACKGROUND ART

In an MBMS (Multimedia Broadcast Multicast Service) of a mobile communication system, data are delivered to a plurality of mobile terminals (UEs: User Equipments) by broadcast or multicast. Data are delivered according to the p-t-p (Point-to-Point) system or the p-t-m (Point-to-Multipoint) system. The p-t-p system is a one-to-one communication system, whereas the p-t-m system is a one-to-many communication system.

As regards the types of bearers over radio channels used for data communications, there are a bearer dedicated for the p-t-p communication (p-t-p bearer) and a bearer dedicated for the p-t-m communication (p-t-m bearer). In the MBMS, the type of bearer can be changed to the other type of bearer depending on the situation during the service.

The p-t-m bearer is established as a common channel over radio channels. Thus, if the p-t-m bearer is used, the common resources are consumed regardless of the number of UEs that receive a service. In contrast, the p-t-p bearer is established as a dedicated channel. Specifically, the p-t-p bearer is established as a dedicated transport channel (DTCH). Since a dedicated channel is set up for each UE, if the p-t-p bearer is used, the resources of dedicated channels corresponding to the number of UEs that receive a relevant service are consumed.

For example, if the number of UEs that requests to receive a particular MBMS service in a cell is 0 or very small, the case in which data are delivered to individual UEs using the dedicated p-t-p bearers consumes less radio resources than the case in which data are delivered to UEs using the common p-t-m bearer.

In contrast, if the number of UEs that request to receive a particular MBMS service in the cell is equal to or greater than a predetermined number, the case in which data are delivered using the p-t-m bearer consumes less radio resources than the case in which data are delivered using the dedicated p-t-p bearers. In addition, using the p-t-m bearer is advantageous to UEs. For example, while receiving an MBMS service through a common channel of the p-t-m bearer, a UE can perform another communication through a dedicated channel.

As described above, by properly selecting the p-t-p bearer or the p-t-m bearer for the MBMS service, the radio resources can be effectively used. To appropriately select the type of bearer, the standard specifications define a counting procedure that counts the number of UEs that requests to receive an MBMS. In addition, various techniques that accurately grasp the number of UEs that request to receive the MBMS have been proposed (for example, refer to JP2007-533217A (translation version)). The counting procedure is basically performed in such a manner that the network side makes inquiries for UEs and counts the number of UEs based on the responses therefrom.

SUMMARY OF THE INVENTION

Problem to be Solved by the Invention

If responses from many UEs with respect to counting concentrate in a short time, problems such as impairment of radio environments and overloading imposed on the network or management devices arise. Thus, the standard specifications take into account those responses from UEs that are not excessive. Specifically, the bearer is determined in such a manner that a response probability as the ratio of UEs as targets for which inquiries are made to all UEs is provided and the response probability is gradually raised from a low value. Thus, the above-described problems are alleviated to some extent.

However, in consideration of radio environments and loads imposed on network or management devices and their margins, it is preferred to suppress as much as traffic that occurs to determine the type of bearer as much as possible.

An object of the present invention is to provide a technique that suppresses traffic that occurs to determine the type of bearer used for a delivery service of a communication system.

Means that Solve the Problem

To accomplish the above-described object, a network controller according to one embodiment of the present invention comprises:

terminal management means that stores information with respect to a terminal that joins a delivery service provided in each cell in a context that serves to manage the information with respect to the terminal;

terminal counting means that counts the number of terminals that joins said delivery service in said each cell on the basis of each service using said context stored in said terminal management means; and bearer determination means that determines whether to use a point-to-point bearer or a point-to-multipoint bearer for said delivery service in said each cell based on said number of terminals counted by said terminal counting means.

A communication system according to one embodiment of the present invention comprises:

a plurality of base station devices, each of which forms a cell and transmits data of a delivery service to a terminal using a bearer of the cell; and a network controller that stores information with respect to a terminal that joins a delivery service provided in each cell in a context that serves to manage the information with respect to the terminal, counts the number of terminals that join said delivery service in said each cell on the basis of each service using said context stored in said terminal management means, and determines whether to use a point-to-point bearer or a point-to-multipoint bearer for said delivery service in said each cell based on said number of terminals counted by said terminal counting means.

A bearer type decision method according to one embodiment of the present invention comprises:

storing information with respect to a terminal that joins a delivery service provided by each cell in a context that serves to manage the information with respect to the terminal;

counting the number of terminals that join said delivery service in said each cell on the basis of each service using said context stored in said terminal management means; and determining whether to use a point-to-point bearer or a point-to-multipoint bearer for said delivery service in said each cell based on said number of terminals counted by said terminal counting means.

BEST MODES THAT CARRY OUT THE INVENTION

Next, with reference to drawings, an embodiment of the present invention will be described in detail.

Figure 1:
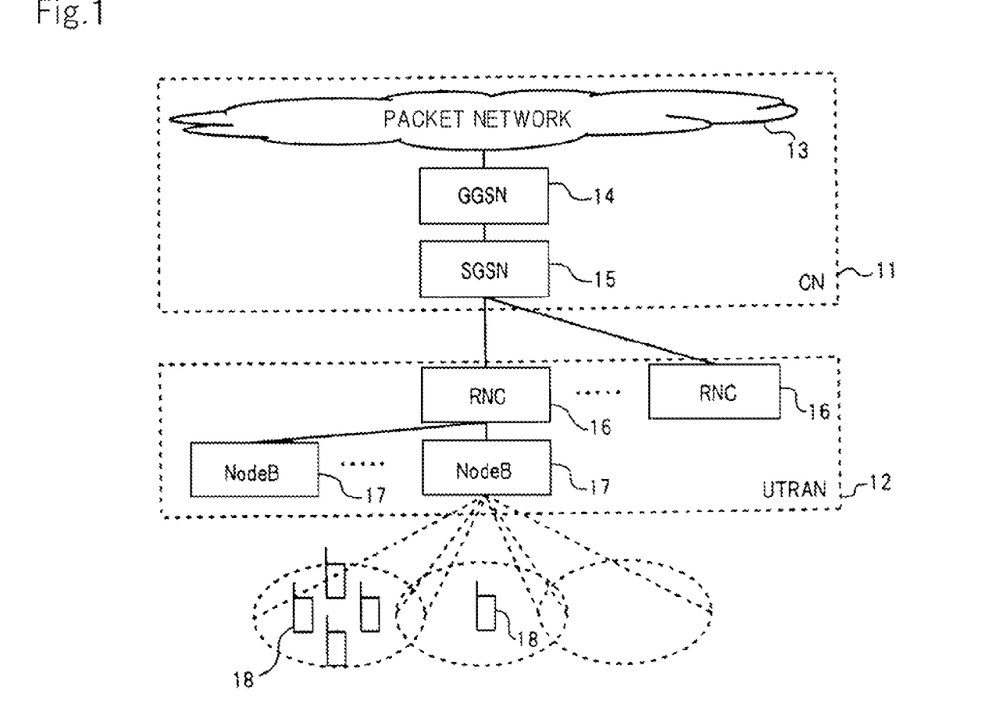
FIG. 1 is a block diagram showing the structure of a 3GPP mobile communication system.

A communication system according to this embodiment is a 3GPP mobile communication system that provides an MBMS. FIG. 1 is a block diagram showing the structure of the 3GPP mobile communication system. Referring to FIG. 1, the 3GPP mobile communication system is composed of core network (CN) 11 and access network (UTRAN; UMTS Terrestrial Radio Access Network) 12.

CN 11 is a network that accomplishes a packet communication through packet network 13 and has GGSN (Gateway GPRS Support Node) 14 connected to packet network 13 and SGSN (Serving GPRS Support Node) 15 connected to GGSN 14.

UTRAN 12 is an access network for a radio mobile communication and has RNC (Radio Network Controller) 16 and base station device (NodeB) 17.

Although NodeB 17 actually transmits radio waves to UE 18, RNC 16 informs UE 18 of set values used in radio communications and services as RRC messages.

RNC 16 grasps information with respect to UEs 18 that are communicating in cells under the control. RNC 16 grasps the number of UEs 18 that are communicating in each cell and the type of bearer that each UE 18 uses. The functions of RNC 16 may be shared by a Control RNC, a Serving RNC, and also a Drift RNC.

Figure 2:
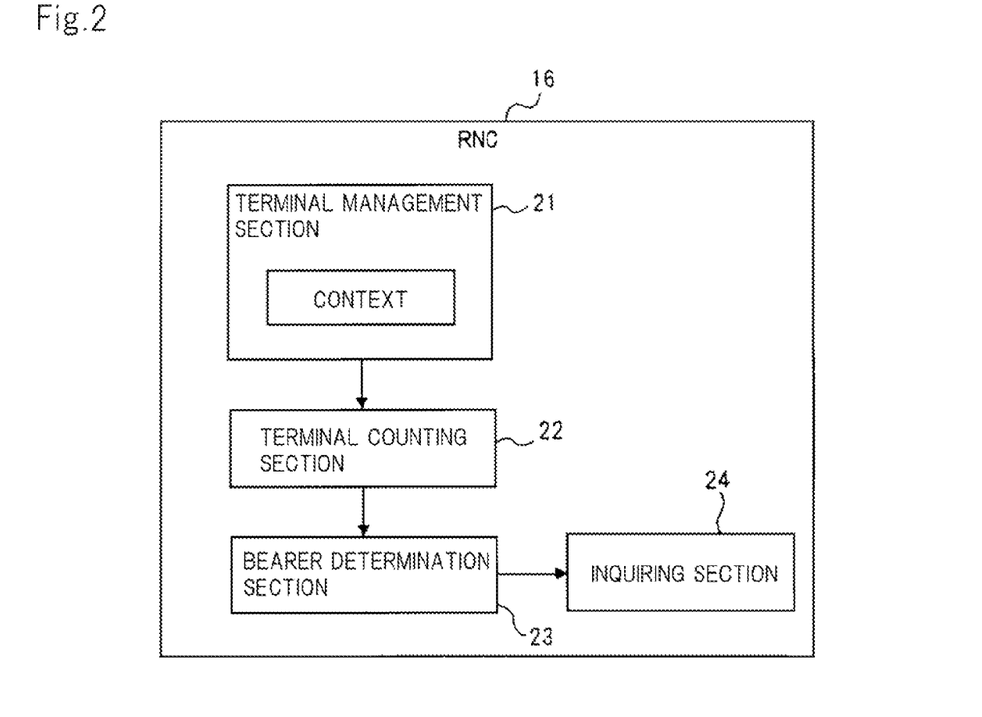
FIG. 2 is a block diagram showing the structure of RNC16.

FIG. 2 is a block diagram showing the structure of RNC 16. Referring to FIG. 2, RNC 16 has terminal management section 21, terminal counting section 22, bearer determination section 23, and inquiring section 24. For example, they may be shared in such a manner that the above-described Control RNC is provided with terminal management section 21, terminal counting section 22, and bearer determination section 23, whereas the Serving RNC is provided with inquiring section 24.

Terminal management section 21 stores information with respect to UEs 18 that join a delivery service that each cell provides in a context that serves to manage information with respect to UE 18.

Terminal counting section 22 counts the number of terminals that is the number of UEs 18 that join a delivery service in each cell on the basis of each service using the context managed by terminal management section 21. Thus, the number of UEs 18 that join the delivery service is counted on the basis of each cell and each service.

Bearer determination section 23 determines whether to use the point-to-point bearer or the point-to-multipoint bearer for each delivery service in each cell based on the number of terminals measured by terminal counting section 22.

Thus, as described above, according to the embodiment, if the type of bearer can, be determined based on the context without necessity of the counting, since the type of bearer is determined without necessity of the counting, the traffic that occurs to determine the type of bearer used for a delivery service of the communication system decreases.

Upon performing the above-described determination, first, terminal counting section 22 counts the number of in-context terminals that is the number of UEs 18 recorded as UE 18 that join each delivery service in each cell. If the number of in-context terminals counted by terminal counting section 22 is equal to or greater than a predetermined threshold (first threshold), bearer determination section 23 decides to use the point-to-multipoint bearer for the delivery service in the cell.

Only if bearer determination section 23 determines that the number of in-context terminals counted by terminal counting section 22 is smaller than the threshold, inquiring section 24 makes inquiries to which a predetermined response probability has been set up and that asks whether or not to join a delivery service to UEs 18 that cannot be counted in cells to which UEs 18 belong based on the context of terminal management section 21. For example, in the case that the cell to which UEs 18 belong is unclear, they may be treated as UEs 18 that cannot be counted in the cell to which they belong.

In the states of UEs 18 in the context, there are a CELL_DCH state, a CELL_FACH state, and a CELL_PCH state. As other states of UEs 18, there are a URA_PCH state and an IDLE state.

The CELL_DCH state represents a state in which each cell to which UE 18 belongs has been identified and a DCH (Dedicated Channel) has been assigned to UE 18. The CELL_FACH state is a state in which each cell to which UE 18 belongs has been identified and it can receive an FACH (Forward Access Channel). The CELL_PCH state represents a state in which each cell to which UE 18 belongs has been identified and it can receive a PCH (Paging Channel). The URA_PCH state is a state in which, although each cell to which UE 18 belongs has not been identified, it can receive the PCH. The IDLE state represents a state in which UE 18 has not been connected to a transport channel. For example, in these states, UE 18 in the URA_PCH state or the IDLE state can be treated as UE 18 of which the cell to which it belongs is unclear.

A response from UE 18 to an inquiry from inquiring section 24 includes information that identifies a delivery service as an inquiry target. Thus, a delivery service as a response target becomes clear and an appropriate bearer can be decided.

If a response from UE 18 denotes that UE 18 joins (or selects) a delivery service and denotes the cell which UE 18 belongs, terminal management section 21 updates the context based on the response from UE 18. Bearer determination section 23 determines whether to use the point-to-point bearer or the point-to-multipoint bearer for the delivery service using the number of in-context terminals of the updated context.

The case in which a response from UE 18 to an inquiry from inquiring section 24 denotes that UE 18 joins (or selects) a delivery service and the cell to which UE 18 belongs is clear is in that, for example, the state of UE 18 that is confirmed by a response is the CELL_DCH state, the CELL_FACH state, or the CELL_PCH state. UEs 18 that are in these states can be counted based on the updated context.

Terminal management section 21 updates the context in such a manner that terminal management section 21 records a cell to which UEs 18, that can be counted based on the context, belong and information that denotes that they join a delivery service of those that have made responses that denote that they join the delivery service. In addition, terminal management section 21 counts the number of out-context terminals that is the number of UEs 18 that are not counted as the number of in-context terminals based on each cell to which UEs 18, that cannot be counted based on the context, belong and information that denotes that they join each delivery service on the basis of each cell and each service.

If the total number of the number of in-context terminals in the updated context and the number of out-context terminals that has been counted is equal to or greater than a predetermined threshold (second threshold), bearer determination section 23 determines to use the point-to-multipoint bearer for the delivery service in the cell. In contrast, if the total number is smaller than the threshold, bearer determination section 23 causes inquiring section 24 to raise the response probability and make inquiries again. When the response probability is raised to 1, if the total number is smaller than the threshold, bearer determination section 23 finally decides to use the point-to-point bearer. The threshold (second threshold) used in this example may be the same as the threshold that is compared in the above description with the number of in-context terminals (first threshold) or different therefrom.

Figure 3:
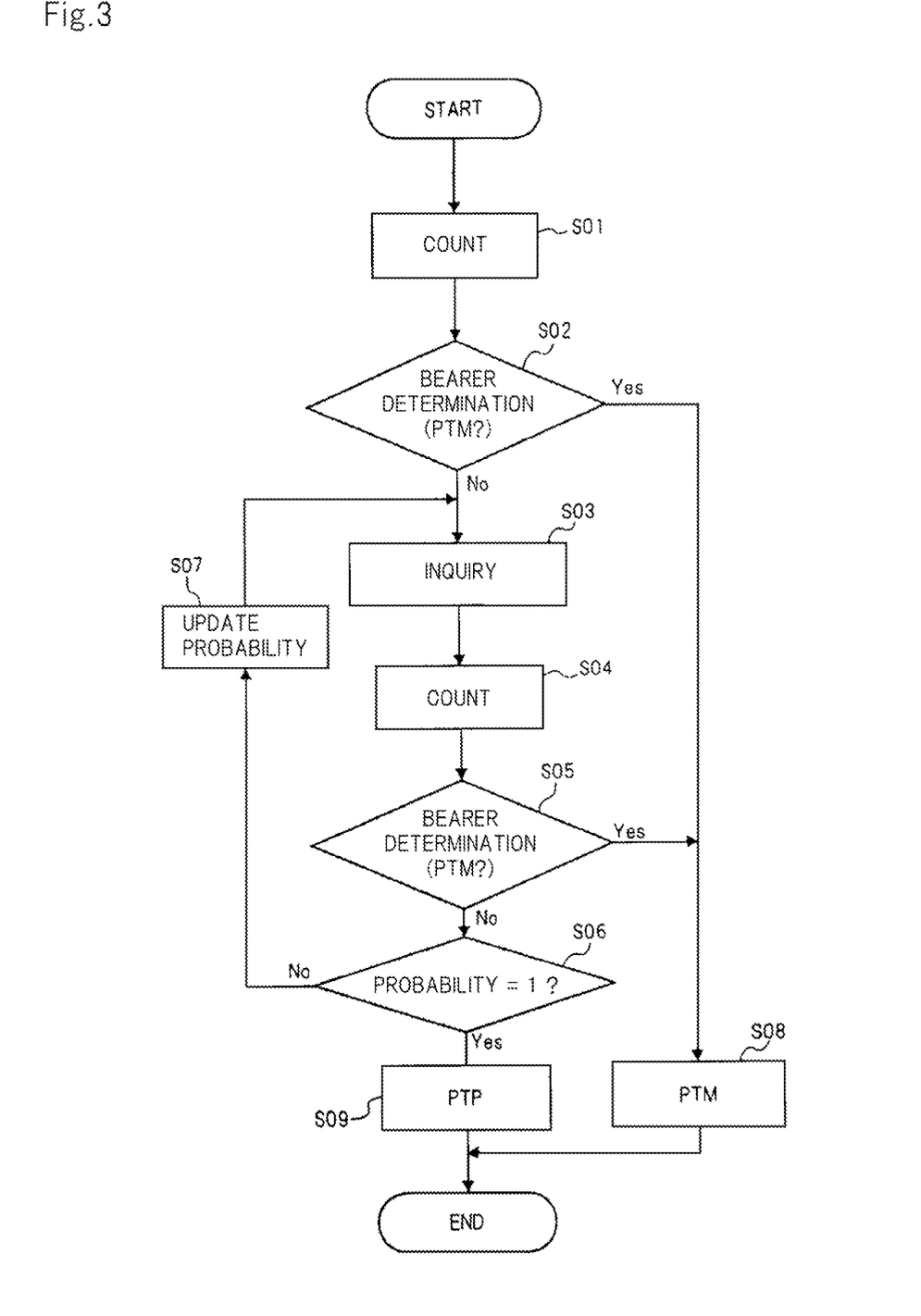
FIG. 3 is a flowchart showing an operation of RNC 16 according to this embodiment.

FIG. 3 is a flowchart showing an operation of RNC 16 according to this embodiment. Referring to FIG. 3, RNC 16 counts the number of in-context terminals (at step S01). Thereafter, RNC 16 determines whether or not to use the point-to-multipoint bearer for the delivery service depending on whether or not the number of in-context terminals is equal to or greater than the first threshold (at step S02). If the number of in-context terminals is equal to or greater than the first threshold, RNC 16 decides to use the point-to-multipoint bearer (at step S08).

If the number of in-context terminals is smaller than the first threshold, RNC 16 transmits inquiries to which a predetermined response probability has been set up and that ask whether or not to join the delivery service to the cells (at step S03).

RNC 16 receives responses against the inquiries, updates the context corresponding thereto, and counts the number of in-context terminals and the number of out-context terminals (at step S04). Thereafter, depending on whether the total number of the number of in-context terminals and the number of out-context terminals is equal to or greater than the second threshold, RNC 16 determines whether or not to use the point-to-multipoint bearer for the delivery service (at step S05). If the total number is equal to or greater than the second threshold, RNC 16 decides to use the point-to-multipoint bearer (at step S08).

If the total number is smaller than the second threshold, RNC 16 determines whether or not the response probability is 1 (at step S06). If the response probability is 1, RNC 16 decides to use the point-to-point bearer for the delivery service (at step S09). In contrast, if the response probability is not 1, RNC 16 rises the response probability and make the inquiries again (at step S07).

In this embodiment, if the type of bearer used for a delivery service in which delivery of data has been started is changed in the middle, a margin may be set up between a threshold used when the type of bearer is to be changed from point-to-point to point-to-multipoint and a threshold used when the type of bearer is to be changed vice versa.

Specifically, a threshold used when the type of bearer is changed from point-to-point to point-to-multipoint can be greater than that used when the type of bearer is changed from point-to-multipoint to point-to-point. Thus, the type of bearer can be prevented from frequently changing near the boundary of the determination.

In the following, an exemplary operation of RNC 16 according to the above-described embodiment will be described in detail.

1. Determination of Bearer

The timings at which the type of bearer is decided can be categorized as follows. The categorized timings will be described in succession. Sessions represent individual MBMS services.

Figure 4:
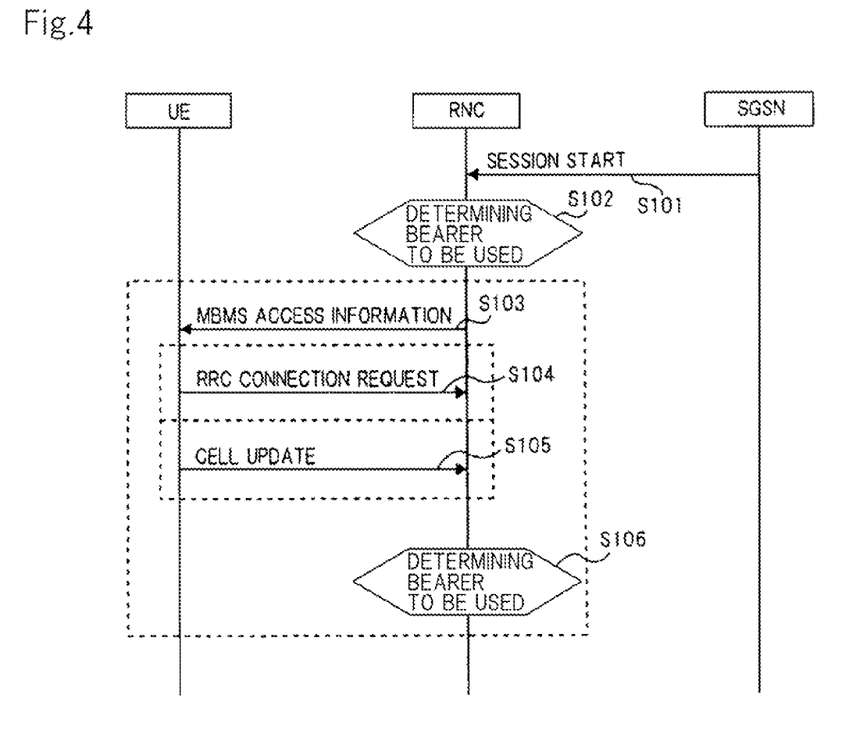
FIG. 4 is a sequence chart showing an example of a bearer determination upon starting of a session.

(1) Determination of bearer used upon starting of session
(2) Determination of changing of bearer during transmission of session
(2-1) During transmission of session by p-t-m bearer
(2-2) During transmission of session by p-t-p bearer FIG. 4 is a sequence chart showing an exemplary bearer determination upon starting of a session. This sequence is equivalent to the above-described (1). Upon starting a session, the type of bearer used for the session is decided.

Figure 5:
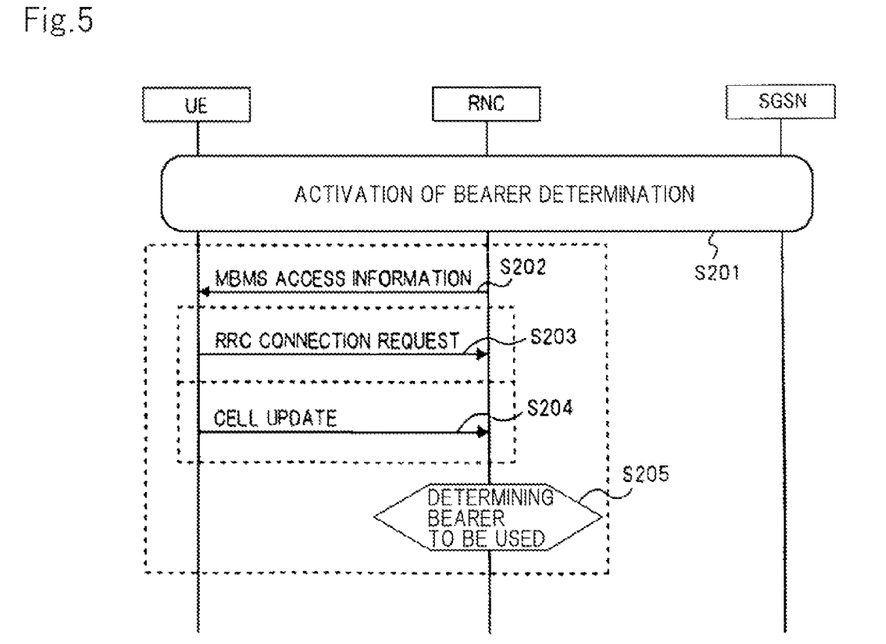
FIG. 5 is a sequence chart showing an example of a bearer determination during the transmission of a session.

FIG. 5 is a sequence chart showing an exemplary bearer determination during the transmission of a session. This sequence is equivalent to the above-described (2). During the transmission of the session, the type of bearer may be changed due to variation of the number of UEs 18 that join in the session.

Symbols used in this example will be described.

The threshold of the number of terminals that determines whether to use either the p-t-p bearer or the p-t-m bearer is denoted by h [units]. The threshold h is preset to an appropriate value. The margin for the threshold h is denoted by m [units]. The margin is also preset to an appropriate value.

(1) Determination of Bearer Upon Starting of Session

With reference to FIG. 4, when a SESSION START MESSAGE is transmitted from the SGSN to the RNC (at step S101), a session of an MBMS service starts. When the RNC receives the SESSION START message, the RNC determines the bearer using the number of UEs counted based on the context (at step S102). Unless confirming the use of the p-t-m bearer for the MBMS service, the RNC makes inquiries such that it transmits an MBMS access information RRC message to UEs that are not recorded in the context (at step S103).

UEs that are in the idle state of the UEs that are not recorded in the context respond to the RNC with a PRC establishment request RRC message (at step S104). UEs that are in the URA_PCH state of the USs that are not recorded in the content respond to the RNC with a cell update RRC message (at step S105).

When the RNC receives these response messages, it counts the total number of the number of in-context terminals and the number of out-context terminals on the basis of each cell and each service and determines the type of bearer (at step S106).

Unless the use of the p-t-m bearer is confirmed in the bearer determination, while the response probability is raised, processes of steps S103 to S106 are repeated until the response probability becomes 1 or until the use of the p-t-m bearer is confirmed.

In the following, the description will be made in detail.

(1-1) The Control RNC (hereinafter referred to as the CRNC) manages information with respect to UEs that it manages based on the context. In this example, a first key of the context is information with respect to cells, a second key thereof is information with respect to services, and a third key thereof is information with respect to UEs.

Specifically, as the first key, Cell numbers under the control of the CRN are stored. As the second key, service numbers that identify provided services and types of their services are stored based on the first key. As the third key, identification information (IDs; identifiers) of UEs and the states of UEs are stored based on the second key. In the states of UEs, there are CELL_DCH/CELL_FACH/CELL_PCH. The context may contain other types of information.

However, there is a restriction in which with respect to UEs that belong to cells under the control of a Drift RNC (hereinafter referred to as the DRNC) instead of a Serving RNC (hereinafter referred to as the SRNC), UEs that are in the CELL_DCH state can be managed based on the third key on the basis of each cell.

The CRNC counts the number of UEs based on the third key of the context and if the number of UEs is equal to or greater than h, the CRNC decides to use the p-t-m bearer. In contrast, if the number of UEs is smaller than h, the CRNC advances to the process of (1-2) without confirming the type of bearer to be used.

(1-2) Each cell to which UEs that are in the URA_PCH state or the IDLE state belong cannot be recognized. Thus, these UEs are not managed based on the context. Thus, to make inquiries of information that denotes that UEs join an MBMS service and cells to which they belong, the SRNC transmits an MBMS access information RRC message for UEs that are in the URA_PCH state or the IDLE state to each cell in the service area.

Since UEs that are in the CELL_FACH state and those that are in the CELL_PCH are recognized on the basis of each cell in the context, inquiry targets using the MBMS access information RRC message can only be UEs that are in the URA_PCH state and those in the IDLE state. Thus, the number of responses from UEs can be decreased and thereby the influence to radio environments and loads imposed on the network can be alleviated.

(1-3) As responses to inquiries using the MBMS access information RRC message, UEs that are in the URA-PCH state transmit a cell update RRC message. In contrast, UEs that are in the IDLE state transmit an RRC establishment request RRC message.

In this embodiment, it is assumed that these response messages include information that denotes what MBMS service they relate to. Specifically, an MBMS Short transmission identity list that represents a response, to that MBMS service inquiry that used the MBMS access information RRC message that is associated with reason information "response to counting," is newly added to these response messages that have been standardized. This is because an MBMS service as a response target to the MBMS access RRC message becomes clear and an appropriate bearer can be decided.

The added information (additional information) corresponds to the MBMS Short transmission identity that represents an MBMS service list as a response request target included in the MBMS access information RRC message. The additional information is included only if the reason information is "response to counting." Even if a UE joins or selects a service, if the number of times of the transmission of a session is multiple, when the UE has correctly received the session, it does not need to receive the session. In this case, the additional information is not necessary. Alternatively, there may be a case in which the UE does not need to transmit a response message.

(1-4) A UE that is in the IDLE state upon an inquiry of (1-2) can change to the RRC Connected state that can be managed based on the context by a response of (1-3). The RRC Connected sate is the CELL_DCH state, the CELL_FACH state, the CELL_PCH state, or the URA_PCH state. When the UE changes to the CELL_DCH state, the CELL_FACH state, or the CELL_PCH state, the CRC associates the information with respect to the UE to information with respect to the MBMS service and adds the result to the context.

(1-5) With respect to an UE that is in the URA_PCH state upon an inquiry of (1-3), by a response, the cell to which the UE belongs and the MBMS service that is a target of a response become clear based on the response. If the UE changes to CELL_FACH or CELL_PCH when a cell update is performed, the CRNC adds the information with respect to the UE to the context like a UE of (1-4).

On the other hand, if a UE that is in the URA_PCH state remains in the URA_PCH state when a cell update is performed, the information with respect to the UE cannot be added to the context. Thus, the CRNC counts the number of UEs that made such responses on the basis of each cell and each service and temporarily stores the number of UEs. The number of UEs that is stored in this case is the number of out-context terminals that was described above.

(1-6) If the total number of the number of UEs counted based on the third key of the context that the CRNC manages (number of in-context terminals) and the number of out-context terminals stored in (1-4) or (1-5) is equal to or greater than the threshold h on the basis of each cell and each service, the CRNC decides to use the p-t-m bearer for the MBMS service. In contrast, if the total number is smaller than h, the CRNC does not decide the type of bearer used for the MBMS service. The CRNC and SRNC raise the response probability to be set up for the MBMS access information RRC message and repeat the processes starting from (1-2).

(1-7) While raising the response probability, when the CRNC repeats the processes from (1-2) to (1-6) and the response probability is 1, namely, makes inquiries for all UEs, if the total number is smaller than h, the CRNC finally decides to use the p-t-p bearer for the MBMS service. For example, if the total number is 0, a bearer may not be assigned for the MBMS service in the cell.

(2) Determination of Changing of Bearer During Transmission of Session

With reference to FIG. 5, when the RNC detects a bearer determination start event during the transmission of a session (at step S201), the RNC starts the bearer determination. The start event may take place, for example, if the number of UEs that the CRNC manages rises to a predetermined number or falls below it because UEs move among cells. Alternatively, the start event may take place if the number of UEs that the CRNC manages varies by a predetermined number or greater because UEs move among cells. Further alternatively, the bearer determination may be started at predetermined time intervals.

The RNC makes inquiries in such a manner that the MBMS access information RRC message is transmitted to UEs that are not recorded in the context (at step S202).

UEs that are not recorded in the context and that are in the IDLE state respond to the RNC using the RRC establishment request RRC message (at step S203). UEs that are not recorded in the context and that are in the URA_PCH state responds to the RNC using the cell update RRC message (at step S204).

When the RNC receives these response messages, it counts the total number of the number of in-context terminals and the number of out-context terminals on the basis of each cell and each service and determines the bearer (at step S205).

In the bearer determination, unless use of the p-t-m bearer is confirmed, while the response probability is raised, until the response probability becomes 1 or the use of the p-t-m bearer is confirmed, the processes from steps S202 to S205 are repeated.

In the following, the description will be made in detail.

(2-1) During transmission of session by p-t-m bearer (2-1-1) During the transmission of a session by the p-t-m bearer, if the number of UEs that can be counted based on the third key of the context is equal to or greater than h-m, the CRNC continues to transmit the session by the p-t-m bearer; if the number of UEs is smaller than h-m, the CRNC proceeds to the process of (2-1-2).

(2-1-2) Like (1-2), the SRNC transmits the MBMS access information RRC message to each cell in the service area.

(2-1-3) Like (1-3) to (1-5), the CRNC updates the context, counts the number of out-context terminals, and stores the result.

(2-1-4) If the total number of the number of in-context terminals counted based on the third key of the context and the number of out-context terminals stored in (2-1-3) is equal to or greater than h-m on the basis of each cell and each service, the CRNC continues to use the p-t-m bearer for the MBMS service. In contrast, if the total number is less than h-m, the CRNC and SRNC raise the response probability that is set up for the MBMS access information RRC message and perform the processes starting from (2-1-2).

(2-1-5) While raising the response probability and repeating the processes from (2-1-2) to (2-1-4), when the response probability becomes 1, namely making inquiries to all UEs, if the total number is less than h-m, the CRNC finally decides to use the p-t-p bearer for the MBMS service. For example if the total number is 0, the MBMS service may not be performed in the cell.

(2-2) During transmission of session by p-t-p bearer (2-2-1) During transmission of a session by the p-t-p bearer, the CRNC uses h+m as a threshold. Specifically, if the total number of the number of in-context terminals and the number of out-context terminals is equal to or greater than h+m, the CRNC changes the bearer for the MBMS service from the p-t-p bearer to the p-t-m bearer. In contrast, if the total number of the number of in-context terminals and the number of out-context terminals is smaller than h+m, the CRNC continues to use the point-to-point bearer for the service.

A UE that is in the CELL_DCH state may have been assigned dedicated channels in a plurality of cells. Thus, the number of UEs that are in the CELL_DCH state is counted on the basis of each radio rink that each UE has in each cell rather than on the basis of the number of physical UEs. This means that one UE may be counted in a plurality of cells.

(2-2-2) If the total number counted in (2-2-1) is 0, it is determined that the bearer used for the MBMS service is p-t-p. In reality, however, the bearer that transmits a session of the MBMS service does not exist in the cell. In this case, thereafter, the SRNC periodically transmits the MBMS access information RRC message to the cell until a UE is registered to the context of the CRNC. Inquiry targets are only UEs that are in the URA_PCH state and the IDLE state.

2. Response Probability in Inquiries

Next, controlling of response probability in inquiries will be described. The response probability is set up for the MBMS access information RRC message.

In the standard, the response probability set up for the MBMS access information RRC message is defined as Formula (1) using a response probability factor APF.

$$AP(APF)=2^{\{-(APF/100)\}}$$

$$(APF=0,32,64,\ldots,960,1000) \quad (1)$$

In the standard, by adjusting the value of APF, the AP is gradually increased so as to suppress the number of UEs that respond to the counting to an adequate number. Thus, uplink signals as responses from UEs can be prevented from concentrating at one time.

In this embodiment, the number of UEs counted based on information with respect to UEs that the RNC manages as the context is used to determine a bearer and the number of UEs that respond to inquiries is estimated so as to adequately select the response probability. Thus, the influence to the radio environments and the loads imposed on the network and devices are alleviated. If a bearer can be determined only based on the number of UEs counted based on the context, it is not necessary to make inquiries to UEs. According to this embodiment, the influence to the radio environments and the loads imposed on the network and devices are alleviated and the bearer determination time can be shortened.

In the context that the CRNC manages like (1-1) described above, it is assumed that the total number of UEs that are in the CELL_DCH state, the CELL_FACH state, or the CELL_PCH state and that have information with respect to an MBMS service as targets for the bearer determination is k.

(1-1), in the case of k<h, a process that makes inquiries using the MBMS access information RRC message starts. Likewise, in (2-1-1), in the case of k<h-m, a process that makes inquiries using the MBMS access information RRC message starts. UEs as inquiry targets are only UEs in the URA_PCH state and UEs that are in the idle state.

The total number of UEs counted as the number of in-context terminals or the number of out-context terminals in the bearer determination of UEs that are in the URA_PCH sate and UEs that are in the idle state are treated as "the number of UEs as counting targets." In other words, the number of UEs as counting targets is the number of UEs that respond to inquiries to which a response probability of "1" has been set up.

The number of UEs that respond to inquiries to which a response probability has been set up (the number of UEs that respond) can be approximated by the value of the left side of Formula (2).

$$\text{(Number of UEs as counting targets)} * AP(APF) \le h-k \quad (2)$$

From a viewpoint of preventing congestion of uplink circuits, it is preferred to set up the response probability such that the number of UEs that respond is minimum while Formula (2) is satisfied.

In this example, inquiries to which a response probability AP (APF_io) using an initial value APF_io has been set up are made and the number of UEs that respond is denoted by n. If the result obtained in the bearer determination is k+n≤h, the RNC can confirm that the p-t-m bearer is used for the MBMS service. In contrast, if the result obtained in the bearer determination is k+n<h, the RNC updates the response probability and continues to perform counting so as to confirm the type of bearer used for the MBMS service.

Since it can be estimated that the number of UEs as counting targets≈n/AP (APF_io), the response probability that satisfies the condition that the number of UEs, n, that correspond satisfies Formula (2) and that is minimum can be selected using the number of UEs as counting targets in the subsequent inquiries.

In the case of k+n/AP (APF_io)≤h, it is implied that the p-t-m bearer is used for the MBMS service. As the subsequent response probability, a value in the range between AP (APF_io) and 1 is selected based on Formula (2).

In contrast, in the case of k+n/AP (APF_io)<h, it is implied that the total value of k and the number of UEs as counting targets does not become h at the end. In this case, in the subsequent inquiries, APF=0, namely AP (APF)=1, can be set.

After responses are obtained from all UEs that request to receive the MBMS service, the number of UEs is counted so as to decide the type of bearer.

3. Setting of Value of Initial Value APF_io of APF

Next, how to set up the initial value APF_io of the above-described PF will be described.

The threshold h with which the type of bearer is determined can be estimated from the bit rate of the p-t-m bearer. When estimated from the bit rate of the p-t-m bearer that has been standardized, it can be estimated that the threshold h is preferably around 2 to 8.

In the case of k<h, the total number of UEs that are in the CELL_DCH state, the CELL_FACH state, and the CELL_PCH state that are associated with the MBMS service is smaller than the threshold h. If the difference between h and k is large, it is likely that the number of UEs that respond to inquiries is small. In this case, when a small response probability AP (APF_io) is set up, the number of UEs as counting targets cannot be adequately estimated. Thus, the initial value APF_io needs to be as high as a value with which the number of UEs as counting targets can be adequately estimated.

In the real system, since an appropriate initial value APF_io depends on the system structure and coverage situation of UEs, a computation formula for the initial value or an initial value decision table is set up based on the system for use.

In this embodiment, while UEs that are counted based on the context are UEs that are in the CELL_DCH state, the CELL_FACH state, or the CELL_PCH state, UEs as inquiry targets using the MBMS access information RRC message are UEs that are in the URA_PCH state or the IDLE state. However, the present invention is not limited to such conditions.

A combination of the states of UEs counted based on the context and the states of UEs as inquiry targets using the MBMS access information RRC message may be another combination. For example, while the number of UEs that are in the CELL_DCH state and that has information with respect to an MBMS service as counting targets may be denoted by k, UEs as counting targets by a process using the MBMS access information RRC message may be UEs that are in all states except for the CELL_DCH state. If the number of repetitions of a session represented in the MBMS session start RANAP message is equal to or greater than two times or the number of repetitions of the session is unclear, the possibility of which the transmission of a first session results in the completion of the reception of the service is considered.

Now, embodiments of the present invention have been described. However, it should be understood by those skilled in the art that these embodiments may be used in combinations or part of their structures may be changed without departing from the scope of the present invention.

The present application is the National Phase of PCT/JP2009/067472, filed Oct. 7, 2009, which claims a priority based on Japanese Patent Application JP 2008-260546 filed on Oct. 7, 2008, the entire contents of which are incorporated herein by reference in its entirety.

The invention claimed is:

1. A network controller comprising:
a terminal management section that stores information with respect to a terminal that joins a delivery service provided in each cell in a context that serves to manage the information with respect to the terminal;
a terminal counting section that counts the number of terminals that joins said delivery service in said each cell on the basis of each service using said context stored in said terminal management; and
a bearer determination section that determines whether to use a point-to-point bearer or a point-to-multipoint bearer for said delivery service in said each cell based on said number of terminals counted by said terminal counting section,
wherein said terminal counting section counts the number of in-context terminals that is the number of terminals recorded in said context as terminals that join said delivery service in said cell, and
wherein if said number of in-context terminals counted by said terminal counting section is equal to or greater than a first threshold, said bearer determination section decides to use the point-to-multipoint bearer for said delivery service in said cell, and
wherein said network controller further comprises:
an inquiring section that makes an inquiry to which a predetermined response probability has been set up and that asks whether or not to join said delivery service to a terminal that cannot be counted in a cell to which the terminal belongs based on said context of said terminal management section if said bearer determination section determines that the number of in-context terminals counted by said terminal counting section is smaller than said first threshold,
wherein said terminal management section updates said context based on a response from said terminal to an inquiry from said inquiring section, and
wherein said bearer determination section determines whether to use the point-to-point bearer or the point-to-multipoint bearer for said delivery service using the number of in-context terminals based on said context that has been updated.

2. The network controller as set forth in claim 1,
wherein said terminal management section updates said context such that a cell to which a terminal that can be counted based on said context belongs and information that denotes that the terminal joins said delivery service of those that have responded to join said delivery service to an inquiry from said inquiring section are recoded and, counts the number of out-context terminals that is the number of terminals that are not counted as said number of in-context terminals on the basis of each cell and each service based on a cell to which a terminal that cannot be counted based on said context belongs and information that denotes that the terminal joins said delivery service,
wherein said bearer determination section decides to use the point-to-multipoint bearer for said delivery service in said cell if the total number of the number of in-context terminals in said context that has been updated and said number of out-context terminals that have been counted is equal to or greater than a second threshold.

3. The network controller as set forth in claim 2,
wherein if said total number is smaller than said second threshold, said bearer determination section causes said inquiring section to raise said response probability and make an inquiry again and if said total number is smaller than said second threshold when said response probability becomes 1, said bearer determination section decides to use the point-to-point bearer for said delivery service in said cell.

4. The network controller as set forth in claim 3,
wherein if said total number is smaller than said second threshold, said bearer determination section selects a response probability used for a subsequent inquiry based on the total number obtained before said inquiry is made, the number of terminals that has been added to said total number based on said inquiry, and said response probability.

5. The network controller as set forth in claim 2,
wherein states in which the terminal can be counted based on said context are CELL_DCH, CELL_FACH, and CELL_PCH defined in 3 GPP and other states are URA_PCH and IDLE.

6. The network controller as set forth in claim 1,
wherein the response from said terminal to said inquiry includes information that identifies a delivery service as the inquiry target.

7. The network controller as set forth in claim 1, comprising:
a controlling network controller having said terminal management section, said terminal counting section, and said bearer determination section, and
a serving network controller having said inquiring section.

8. The network controller as set forth in claim 1,
wherein a terminal that belongs to said cell and that cannot be counted is a terminal of which a cell to which it belongs is unclear.

* * * * *